(No Model.)

T. DAVIDSON.
APPARATUS FOR SOLDERING THE ENDS OF CANS.

No. 418,605. Patented Dec. 31, 1889.

UNITED STATES PATENT OFFICE.

THOMAS DAVIDSON, OF MONTREAL, QUEBEC, CANADA.

APPARATUS FOR SOLDERING THE ENDS OF CANS.

SPECIFICATION forming part of Letters Patent No. 418,605, dated December 31, 1889.

Application filed August 27, 1889. Serial No. 322,155. (No model.)

*To all whom it may concern:*

Be it known that I, THOMAS DAVIDSON, of the city of Montreal, in the district of Montreal and Province of Quebec, Dominion of Canada, have invented certain new and useful Improvements in Apparatus for Securing the Ends on Cans; and I do hereby declare that the following is a full, clear, and exact description of the same.

My invention has reference to the method of soldering the ends in place by dipping, and to provide simple and effectual means by which this operation can be performed without any chance of the solder adhering to the head of the can. I propose to place on the surface of the molten solder contained in any suitable vessel a disk or float flat on the top, of asbestus or other suitable material. The can to be dipped is placed on this disk and pressed evenly slightly down, which will bring the edge of the end below the surface of the molten solder, so as to solder it at the proper place, the disk on which the can rests being in contact with the whole surface of the can-head, keeping the solder from spreading over the bottom of the can and attaching itself thereto.

For full comprehension of the invention reference must be had to the annexed drawings, in which—

Figure 1:
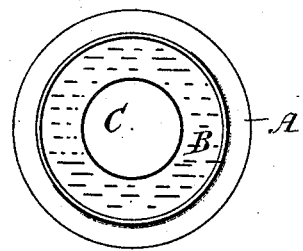
Figure 2:
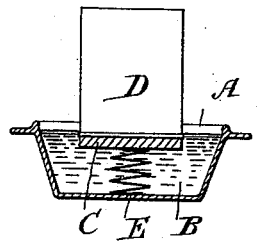

Figure 1 is a plan view of the solder-vessel, and Fig. 2 a sectional view taken through same, similar letters of reference indicating like parts.

A is the vessel; B, the molten solder; C, the disk or float of asbestus, and D the can. I prefer to make this disk of asbestus on account of its buoyancy and durability under the requirements.

In all soldering apparatus in which a float of any metallic substance is used such float will be "tinned" by the flux and solder, and the sticking of the can-bottom to the float or platform, and consequent difficulty in detaching therefrom the can when soldered, cannot be obviated. To lessen this adhesion as much as possible, it has been the practice hitherto to dish the supporting-platform, so that the can-bottom simply rests on the edge; but in this case it can be in close contact with and supported by the whole surface of the float, and the flux or solder will not bind them together.

What I claim is as follows:

In combination with a bath of solder, a buoyant non-metallic disk with flat upper surface resting on the surface of such solder, as and for the purpose described.

Montreal, 20th day of August, A. D. 1889.

THOS. DAVIDSON.

In presence of—
FRED. J. SEARS,
FRAS. HY. REYNOLDS.